Figure 1:
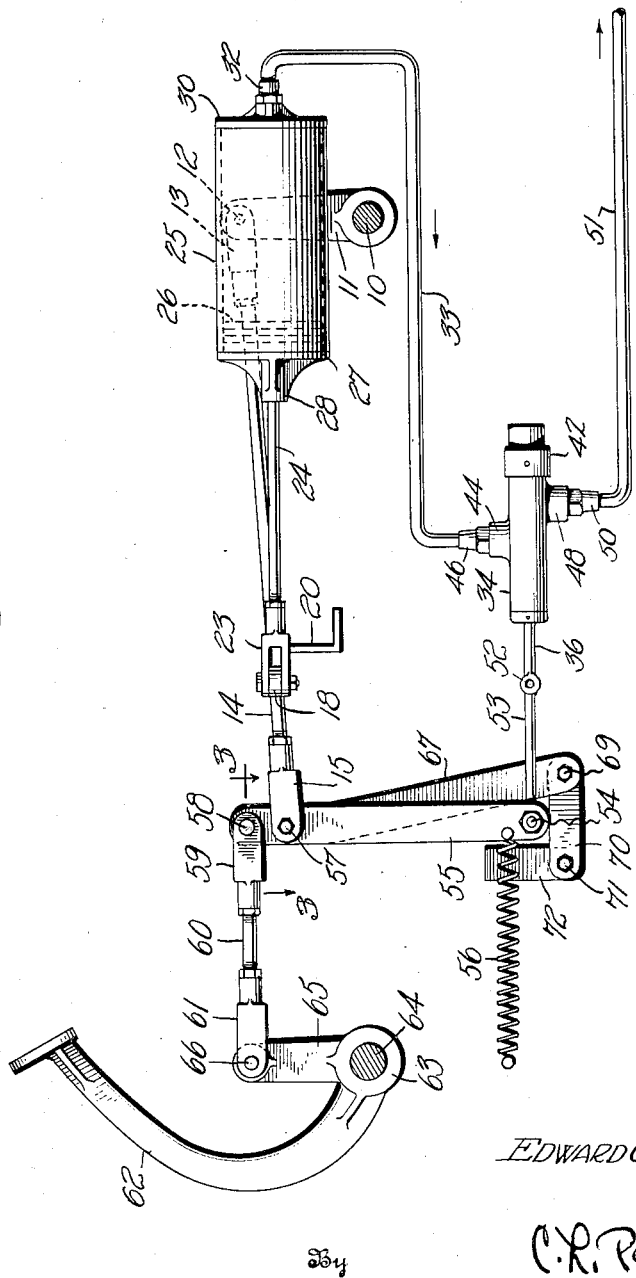

April 25, 1933.  E. G. HILL  1,905,984

CLUTCH OPERATING DEVICE FOR MOTOR VEHICLES

Filed Oct. 22, 1930  2 Sheets-Sheet 1

Inventor
EDWARD G. HILL

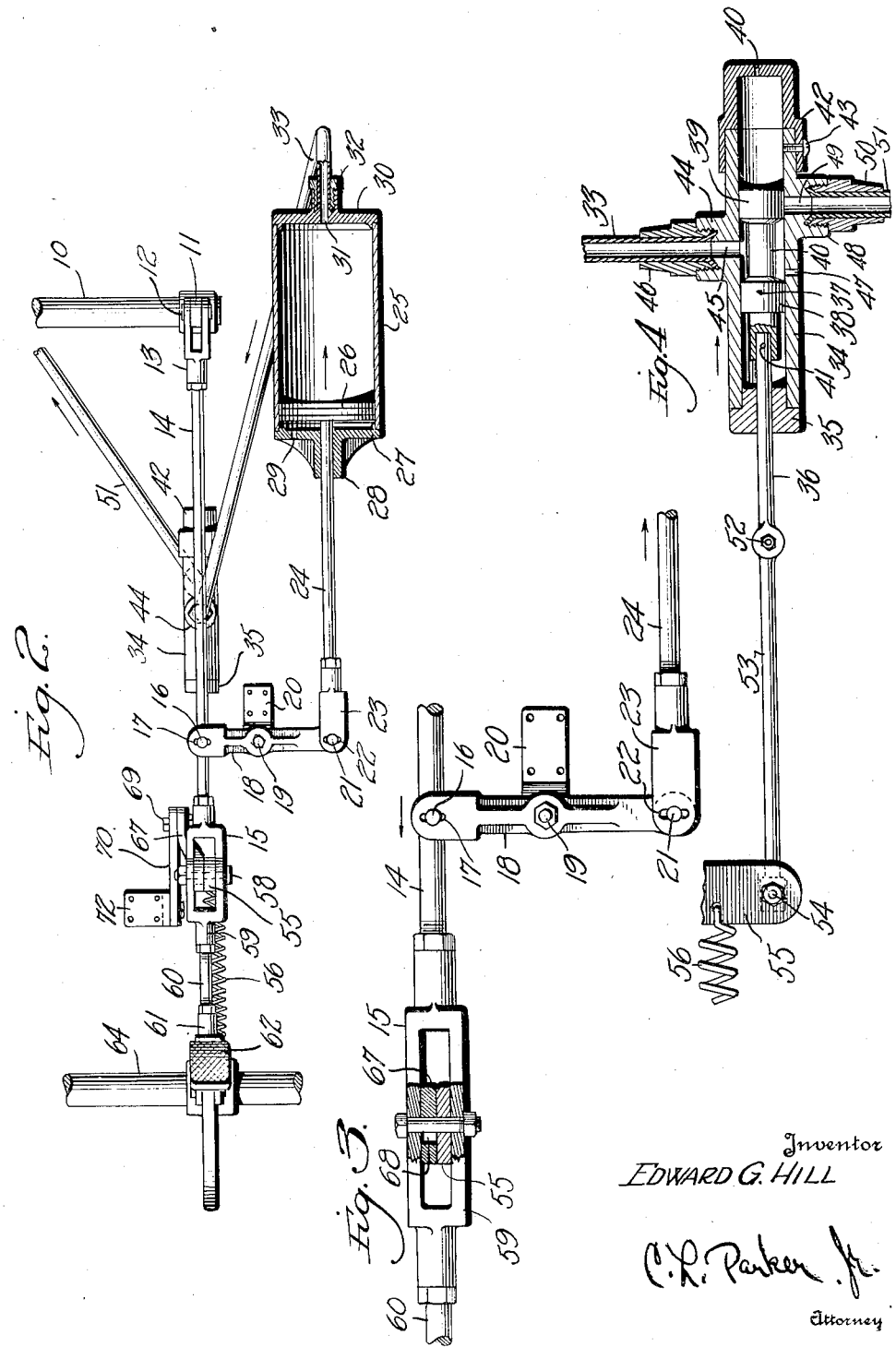

Patented Apr. 25, 1933

1,905,984

UNITED STATES PATENT OFFICE

EDWARD G. HILL, OF RICHMOND, VIRGINIA, ASSIGNOR TO HILL ENGINEERING CORPORATION, OF RICHMOND, VIRGINIA, A CORPORATION OF VIRGINIA

CLUTCH OPERATING DEVICE FOR MOTOR VEHICLES

Application filed October 22, 1930. Serial No. 490,507.

This invention relates to clutch operating devices for motor vehicles.

As is well known, considerable effort is required to depress the clutch pedals of motor vehicles, and this is particularly true of large trucks or buses. In the latter classes of vehicles, the heavy loads placed upon the vehicle motor require the use of heavy clutch springs, which results in the great physical effort necessary for the operation of the pedals. In the case of buses, the effort required for operating the clutch pedals is a quite serious consideration owing to the number of times the driver of a bus is required to operate the clutch.

It has been proposed to provide power actuated means for operating the clutch pedals of motor vehicles, and devices adapted for this purpose are disclosed in my copending applications Serial Nos. 364,246, filed May 18th, 1929, 480,598, filed September 8th, 1930, and 487,319, filed October 8th, 1930.

An important object of the present invention is to provide novel means for controlling through the clutch pedal of a motor vehicle, the clutch actuating power means so as to simulate the conventional operation of the clutch pedal.

A further object is to provide a device of the character referred to wherein the pedal is operated in accordance with standard practice except that depression of the pedal is accomplished with very little effort, the effort required being only sufficient to operate the control means associated with the power device.

A further object is to provide a clutch operating mechanism which is controlled through the medium of a pedal and to provide means whereby the pedal may be depressed by physical effort to operate the clutch in accordance with standard practice if the operation of the power device should fail for any reason.

A further object is to provide novel control means for the power device which is adapted to cause the latter to move the clutch elements to a position corresponding to the position of the clutch pedal to further simulate the standard mode of operating the clutch.

A further object is to provide a clutch operating mechanism including a power device for transmitting movement to the clutch elements and adapted to be controlled from an operating pedal in such a manner that movement of the pedal to partly depressed position will cause the clutch elements to move correspondingly, the control connections being of such a nature that movement of the clutch elements to engaging position will correspond to the return movement of the pedal to normal position whereby the operator is enabled to readily control the clutch to prevent the elements thereof from grabbing.

Other objects and advantages of the invention will become apparent during the course of the following description.

In the drawings I have shown one embodiment of the invention. In this showing,

Figure 1 is a side elevation of the assembled apparatus detached from the vehicle, parts being shown in section, Figure 2 is a plan view of the same, parts being shown in section, Figure 3 is a detail section on line 3—3 of Figure 1, and, Figure 4 is a detail sectional view through the valve mechanism and associated elements.

Referring to the drawings the numeral 10 designates the operating shaft of a motor vehicle clutch (not shown) to which is connected an operating arm 11. This arm is pivotally connected at its upper end as at 12 to a yoke 13 carried by the rear end of a pull rod 14. The pull rod 14 is provided at its forward end with a yoke 15 for a purpose to be described.

Near its forward end, the rod 14 is provided with a pin 16 operating in slots 17 formed in the forked end of a lever 18. This lever is pivotally supported upon a pin 19 carried by a bracket 20, and the bracket may be supported upon any suitable part of the vehicle frame. The opposite end of the lever 18 is provided with a pin 21 operating in a slot 22 formed in a yoke 23. This yoke is connected to the forward end of a piston rod 24.

Referring to Figure 2, the numeral 25 designates a differential pressure cylinder supported in any suitable way by the frame of the vehicle. A piston 26 is mounted to reciprocate in the shoulder 25 and is connected to the rear end of the rod 24, as shown. The forward end of the cylinder is closed by a head 27 carrying a bearing 28 in which the rod 24 reciprocates, and the head 27 is provided with a preferably screened vent opening 29. The rear end of the cylinder 25 is closed by a head 30 having a port 31 therein, and the head 30 is connected by a union 32 to a suction pipe 33 to be referred to later.

Referring to Figure 4, the numeral 34 designates a preferably cylindrical valve casing closed at its forward end by a head 35 forming a bearing to support a rod 36 for reciprocation therein. A valve indicated as a whole by the numeral 37 is adapted to reciprocate in the casing 34 and is provided with spaced valve heads 38 and 39 connected by a reduced shank 40. The valve normally occupies the position shown in Figure 4 and is connected by a pin 41 to the rear end of the rod 36. The rear end of the valve is closed by a head 42 secured thereto by screws 43, and the rear head may be vented by a small opening 40 to prevent the creation of pressure in the rear end of the cylinder when the valve moves rearwardly. One side of the valve casing is provided with a boss 44 having a port 45 therein, and this boss is connected by a union 46 to the pipe 33 previously described. The valve casing also is provided with a vent port 47 open to the atmosphere, and accordingly it will be apparent that when the valve is in normal position, the rear end of the cylinder 25 is open to the atmosphere through the pipe 33, around the reduced portion of the valve 37, and through the port 47.

The valve casing also is provided with a boss 48 longitudinally spaced from the port 45, and the boss 48 is provided with a port 49 normally closed by the valve head 39. A union 50 connects the boss 48 to one end of a pipe 51, and the opposite end of this pipe is connected to the intake manifold of the vehicle engine.

The forward end of the rod 36 is pivotally connected as at 52 to the rear end of a link 53. This link, in turn, is pivotally connected as at 54 to the lower end of a valve control lever 55. A spring 56 normally holds the lever 55, and consequently the valve 37, in normal position. The forward end of the spring 56 may be connected to any suitable stationary part of the vehicle.

At a point spaced from its upper end, the lever 55 is pivotally connected as at 57 to the yoke 15 previously described. At its upper extremity, the lever 57 is pivotally connected by a pin 58 to a yoke 59 connected to the rear end of a rod 60. The forward end of this rod also carries a yoke 61, as shown in Figure 1. A control pedal 62 is provided at its lower end with a collar 63 rotatable about a fixed shaft 64. The collar 63 is provided with an integral upstanding arm 65 pivotally connected at its upper end to the yoke 61 by a pivot pin 66.

A second lever 67 is arranged adjacent the lever 55. The pivot pin 57 also serves to pivotally connect the yoke 15 to the lever 67 at a point spaced from its upper end, while the upper extremity of the lever 67 is transversely slotted as at 68 for the reception of the pivot pin or bolt 58. It will be apparent that initial movement of the pedal 62 is immediately transmitted to the lever 55, while the bolt 58 moves forwardly an appreciable distance in the slot 68 before transmitting any movement to the upper end of the lever 67.

The lower extremity of the lever 67 is pivotally connected by a pin 69 to the rear end of a link 70. This link is pivotally connected at its forward end by a bolt 71 to a bracket 72 which is fixed to any suitable stationary part of the vehicle frame or body. It will be apparent that the link connection for the lower end of the lever 67 prevents the lower end of this lever from partaking of any appreciable movement horizontally, but permits it to move vertically to accommodate itself to the positions of the elements to which the upper portion of the lever 67 is connected.

The operation of the apparatus is as follows:

When it is desired to render the clutch inoperative, the pedal 62 is depressed in accordance with standard practice, and this action exerts a pull on the upper end of the lever 55. As previously stated, the lever 55 is pivotally connected to the yoke 59 whereby forward movement of the latter is immediately transmitted to the lever 55 to move the upper end of this lever forwardly. The lever referred to pivots about the pivot pin 57, and thus the lower end of the lever moves rearwardly to actuate the valve 37, and thus this valve will move rearwardly to operative position. When the valve is in such position, the head 38 closes the port 47, while the cut out portion of the valve affords communication between the pipes 33 and 51, through the ports 45 and 49. As previously stated, movement of the yoke 59 is not immediately transmitted to the lever 67, due to the lost motion between these elements provided by the slot 68. Accordingly the movement of the pedal 62 will not be transmitted to the pull rod 14 connected to the clutch shaft 10.

When the valve assumes the operative position referred to, the intake manifold will be placed in communication with the rear end of the cylinder 25, the pipes 33 and 51 being connected to each other in the manner described. Air thus will be exhausted from the rear end of the cylinder 25 to set up a differential pressure in opposite ends of the cylinder, and the piston 26 will start to move rearwardly. Rearward movement of the piston is transmitted to the rod 24, and thus to the lever 18 to swing this lever about its pivot. Accordingly the pull rod 14 will be moved forwardly and will exert a pull upon the arm 11 to swing the shaft 10 and operate the usual clutch throw out collar. Whether the clutch will be wholly disengaged will depend upon the degree of movement of the pedal 62 as will become apparent.

As the various actions described take place, it will be apparent that forward movement of the clutch pull rod 14 will be transmitted to the levers 55 and 67, and if the pedal is only partially depressed and held in such position, the lever 55 will pivot about the bolt 58 to cause the lower end of the lever 55 to move the valve 37 toward normal position, and thus further accumulation of differential pressure in the cylinder 25 will be prevented, and the movement of the parts will be arrested. However, if the pedal 62 is caused to continue its forward and downward movement, the pivoting of the lever 55 in the manner referred to will not take place, but on the contrary, the bolt 58 will move forwardly in accordance with the forward movement of the bolt 57, and thus the valve 37 will remain in operative position and the piston 26 will continue to its limit of movement to completely disengage the clutch elements.

When it is desired to return the clutch to operative position, the pedal 62 will be permitted to move upwardly in accordance with standard practice, except that the operator is not called upon to resist the movement of the clutch springs, the tension of these springs being taken up by the differential pressure operating against opposite sides of the piston 26. The relatively light spring 56 tends to move the valve toward normal position and tends to move the lower end of the lever 55 forwardly. Thus when the pedal 62 is permitted to move upwardly and rearwardly, the spring 56 will urge the lower end of the lever 55 forwardly, while movement of the pin 57 will be arrested by the differential pressure previously established in opposite ends of the cylinder 25. Return movement of the valve toward normal position will cause it to reach the point where the port 47 will be partially opened, and the head 37 will close the port 49. Thus air will be permitted to move through the pipe 33 to gradually satisfy the depression in the rear end of the cylinder 25, and the piston will move forwardly toward normal position.

Assuming that the pedal 62 is not permitted to return entirely to normal position, but is held in an intermediate position, movement of the bolt 58 when such position is reached will stop, and continued rearward movement of the pull rod 14 as this element returns to normal position, will cause the lever 55 to pivot about the pin 58, thus swinging the lower end of the lever 55 rearwardly closing the port 47, while the head 39 will again partially open the port 47 to prevent further reestablishment of pressure equalization in the cylinder 25, whereupon movement of the piston 26 will be arrested in a position in its movement corresponding to the movement of the pedal 62 toward normal position.

The partial return movement of the pedal 62 described corresponds generally to the standard practice in permitting clutch pedals to return to normal position. As is well known, it is the practice to permit the clutch pedal to return rapidly to a point where the clutch elements are about to engage each other, whereupon the clutch pedal is permitted to move slowly to normal position to prevent the clutch elements from grabbing. This action may be carried out quite accurately with the present device as will be apparent from the foregoing description. The clutch pedal may be permitted to return rapidly toward normal position whereupon the action described will take place, the clutch elements being permitted to move rapidly up to the point where they are about to engage each other, due to the relatively rapid movement of air into the rear end of the cylinder 25. When the movement of the pedal 62 slows down in accordance with the usual practice, movement of the piston 26 will be correspondingly retarded since any tendency of the pull rod 14 to move rearwardly too rapidly will actuate the valve mechanism in the manner described to reestablish a pressure differential in the cylinder 25 to arrest movement of the piston 26. Accordingly it will be apparent that the return movement of the clutch elements will correspond to the movement of the clutch pedal 62. In other words, when the pedal 62 moves rapidly, the clutch elements will move with corresponding rapidity, whereas when the pedal 62 moves slowly, the movement of the clutch elements will be correspondingly retarded.

The same relationship between the movement of the pedal 62 and the clutch element exists when the pedal is depressed. So long as the movement of the clutch pedal continues its downward movement, the rate of movement of the bolt 58 will correspond to that of the bolt 57, and the valve will not be disturbed. If the movement of the clutch pedal is arrested, however, tendency of the rod 14 to move forwardly will move the valve 37 to normal position in the manner described.

From the foregoing it will be apparent that the device is operative in accordance with standard practice for effecting the engagement or disengagement of the clutch, the movements of the clutch elements being under perfect control at all times through the controlling of the pedal 62. Thus it will be apparent that practically no physical exertion is necessary for operating the clutch, and this is of great importance in connection with the operation of heavy trucks and buses. In this connection it may be stated that the embodiment of the invention illustrated is designed for installation on certain types of buses wherein the clutches are located a substantial distance rearwardly of the clutch pedals. The device, however, is readily adapted for installation on other types of motor vehicles.

The operation previously described takes place when the device is functioning properly, and since the construction of the device is extremely simple it has been found that its operation is thoroughly dependable. Every mechanical apparatus, however, is sooner or later subject to breakage or derangement of parts, and for this reason, the lever 67 and associated elements is provided in order that the clutch may be directly operated by foot pressure if it should become necessary. It will be apparent from the foregoing description that the lever 67 takes no part in the normal operation of the apparatus nor does it interfere in any way with such normal operation. This lever, however, is adapted to transmit foot pressure to the clutch to operate the latter if there should be any breakage or derangement of parts which would prevent the normal operation of the device.

As previously stated, initial downward movement of the pedals 62 does not transmit any movement to the lever 67 because of the provision of the slot 68 in the upper end thereof, and under normal conditions, the lost motion in the slot 68 is not taken up. The reason for this is that under normal conditions, progressive downward movement of the pedal 62 is accompanied by progressive forward movement of the pull rod 14 under the influence of the differential pressure in the cylinder 25, and accordingly the upper end of the lever 67 follows the bolt 58 without being pulled forwardly by this element.

In the event of a failure in the apparatus, however, the pull rod 14 will not be urged forwardly by the differential pressure, and accordingly forward and downward movement of the pedal 62 will take up the play in the slot 68, and the exertion of a downward force on the pedal 62 will transmit a pulling force to the rod 14 to disengage the clutch elements. Obviously, the forward end of the rod 14 travels in a fixed path since it is supported by the lever 18, and it will be apparent that the use of the link 70 permits the lever 67 to partake of slight vertical movement as may be necessary to accommodate the lever to the position of the bolt 57. The link 70, however, fixes the lower end of the lever 67 against a substantial horizontal movement so that it will be apparent that the pulling force referred to will be transmitted to the rod 14.

From the foregoing it will be apparent that the present apparatus provides a clutch operation which simulates the conventional operation of the clutch, the pedal 62 being identical with the ordinary clutch pedal. It is unnecessary for the operator to exert a substantial force against the pedal, however, it being necessary merely to overcome the slight tension of the spring 56 and the friction of the few parts directly actuated by the pedal 62. It also will be apparent that in the event the apparatus fails properly to function, the device may be operated by foot pressure in accordance with standard practice, and the operator's foot already will be in the proper position to exert the necessary pedal pressure.

The present invention is particularly intended for use as operating means for motor vehicle clutches and has been so illustrated and described. It will be apparent, however, that the invention is equally applicable as means for operating the brake mechanisms of motor vehicles. In this connection it will be noted that movement of the shaft of the pressure operated device corresponds to the movement imparted to the pedal, and accordingly it will be apparent that any desired application of the brakes may be obtained when the device is used as brake operating means.

Accordingly it will be apparent that the invention is not limited to its application as a clutch operating device, but may be employed as a brake operating means. Thus the invention has been referred to in the claims as means for actuating a motor vehicle "operating member" which expression is intended to mean some part of the mechanism associated with and adapted for operating the clutches or brakes of motor vehicles.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. The combination with a motor vehicle operating member, of a pedal, a pivot pin connected to said pedal to be moved thereby, a control lever connected at one end to said pivot pin, an actuating lever having a slot in one end receiving said pin to permit initial movement of said pedal without transmitting movement to said actuating lever, a pull rod connected to said operating member and pivotally connected to both of said levers intermediate the ends thereof, means at the other end of said actuating lever to prevent movement thereof longitudinally of said pull rod, a power device for actuating said operating member, and a control device for said power device connected to the other end of said control lever to be actuated thereby and render said power device operative upon initial movement of said pedal.

2. The combination with a motor vehicle operating member, of a pedal, a pivot pin connected to said pedal to be moved thereby, a control lever connected at one end to said pivot pin, an actuating lever having a slot in one end receiving said pin to permit initial movement of said pedal without transmitting movement to said actuating lever, a pull rod connected to said operating member and pivotally connected to both of said levers intermediate the ends thereof, means at the other end of said actuating lever to prevent movement thereof longitudinally of said pull rod, a differential pressure power device for actuating said operating member, and valve mechanism connected to the other end of said control lever to be actuated thereby to establish a pressure differential in said power device upon initial movement of said pedal.

3. The combination with a motor vehicle operating member, of a pedal, a link connected at one end to said pedal and provided at its opposite end with a pivot pin, a control lever connected at one end to said pivot pin, an actuating lever arranged adjacent said control lever and having a slot in one end receiving said pin to permit initial movement of said pedal without transmitting movement to said actuating lever, a pull rod connected to said operating member and pivotally connected to both of said levers intermediate the ends thereof, means at the other end of said actuating lever to prevent movement thereof longitudinally of said pull rod, a differential pressure power device for actuating said operating member and including a shaft, mechanical means connecting said shaft to said pull rod, and valve mechanism connected to the other end of said control lever to be actuated thereby to establish a pressure differential in said power device upon initial movement of said pedal.

4. Apparatus of the character described comprising a pedal, a pivot pin connected to said pedal to be moved thereby, a control lever connected at one end to said pivot pin, an actuating lever having a slot in one end receiving said pin to permit initial movement of said pedal without transmitting movement to said actuating lever, a pull rod connected to a motor vehicle operating member and pivotally connected to both of said levers intermediate the ends thereof, means at the other end of said actuating lever to prevent movement thereof longitudinally of said pull rod, a power device for actuating said operating member, and a control device for said power device connected to the other end of said control lever to be actuated thereby and render said power device operative upon initial movement of said pedal.

5. Apparatus of the character described comprising a pedal, a pivot pin connected to said pedal to be moved thereby, a control lever connected at one end to said pivot pin, an actuating lever having a slot in one end receiving said pin to permit initial movement of said pedal without transmitting movement to said actuating lever, a pull rod connected to a motor vehicle operating member and pivotally connected to both of said levers intermediate the ends thereof, means at the other end of said actuating lever to prevent movement thereof longitudinally of said pull rod, a differential pressure power device for actuating said operating member, and valve mechanism connected to the other end of said control lever to be actuated thereby to establish a pressure differential in said power device upon initial movement of said pedal.

6. Apparatus of the character described comprising a pedal, a link connected at one end to said pedal and provided at its opposite end with a pivot pin, a control lever connected at one end to said pivot pin, an actuating lever arranged adjacent said control lever and having a slot in one end receiving said pin to permit initial movement of said pedal without transmitting movement to said actuating lever, a pull rod connected to a motor vehicle operating member and pivotally connected to both of said levers intermediate the ends thereof, means at the other end of said actuating lever to prevent movement thereof longitudinally of said pull rod, a differential pressure power device for actuating said operating member and including a shaft, mechanical means connecting said shaft to said pull rod, and valve mechanism connected to the other end of said control lever to be actuated thereby to establish a pressure differential in said power device upon initial movement of said pedal.

7. The combination with a motor vehicle operating member, of a pull rod connected to the operating member, a control lever and an actuating lever lying in adjacent substantially parallel planes, valve mechanism connected adjacent one end of said control lever, means at one end of said actuating lever to prevent movement thereof longitudinally of said pull rod, said pull rod being connected to both of said levers remote from said ends thereof, a differential pressure power device including a shaft, mechanical means connecting said shaft to said pull rod, a pedal, a link connected at one end to said pedal, and a pivot pin carried by the other end of said link and pivotally connected to said control lever, said actuating lever being provided with a slot receiving said pin whereby said control lever is actuated in advance of said actuating lever upon initial movement of said pedal to cause said valve mechanism to estalish a pressure differential in said power device.

8. Apparatus of the character described comprising a pull rod connected to an operating member of a motor vehicle, a control lever and an actuating lever lying in adjacent substantially parallel planes, valve mechanism connected adjacent one end of said control lever, means at one end of said actuating lever to prevent movement thereof longitudinally of said pull rod, said pull rod being connected to both of said levers remote from said ends thereof, a differential pressure power device including a shaft, mechanical means connecting said shaft to said pull rod, a pedal, a link connected at one end to said pedal, and a pivot pin carried by the other end of said link and pivotally connected to said control lever, said actuating lever being provided with a slot receiving said pin whereby said control lever is actuated in advance of said actuating lever upon initial movement of said pedal to cause said valve mechanism to establish a pressure differential in said power device.

In testimony whereof I affix my signature.

EDWARD G. HILL.